April 21, 1953   C. L. WHITE   2,635,795
TIRE RACK

Filed July 17, 1950   3 Sheets-Sheet 2

Inventor
Clifford L. White

By

ATTORNEYS

April 21, 1953     C. L. WHITE     2,635,795
TIRE RACK

Filed July 17, 1950     3 Sheets—Sheet 3

INVENTOR
Clifford L. White
BY
ATTORNEYS

Patented Apr. 21, 1953

2,635,795

UNITED STATES PATENT OFFICE 2,635,795

TIRE RACK

Clifford L. White, Salinas, Calif.

Application July 17, 1950, Serial No. 174,349

3 Claims. (Cl. 224—42.22)

This invention is directed to, and it is an object to provide, a novel rack or carrier for vehicle tires; the device being especially designed, but not limited, for use on trucks to carry a large, heavy tire and wheel unit.

Another object of this invention is to provide a tire rack which includes a novel swing arm arranged to support a tire and wheel unit for swinging motion between a vertical position accessible beyond the vehicle frame, and a horizontal carrying position under the frame.

A further object of this invention is to provide a novel expansible clamping device or expansible chuck for releasably securing the tire and wheel unit on the swing arm.

An additional object of the invention is to provide a tire rack, of the type described, which includes a novel suspension hook assembly for receiving and supporting the tire and wheel unit, from the frame of the vehicle, for carrying or transport.

Still another object of the invention is to provide a tire rack which is designed for ease and economy of manufacture and installation; the device when in use being very sturdy, rugged, and convenient to manipulate.

A still further object of the invention is to provide a practical and reliable tire rack, and yet one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the numeral 1 indicates, somewhat diagrammatically, the main frame of a truck or other vehicle, which frame is exposed beneath the same for the reception of a spare tire and wheel unit 2 when disposed horizontally.

Figure 1:
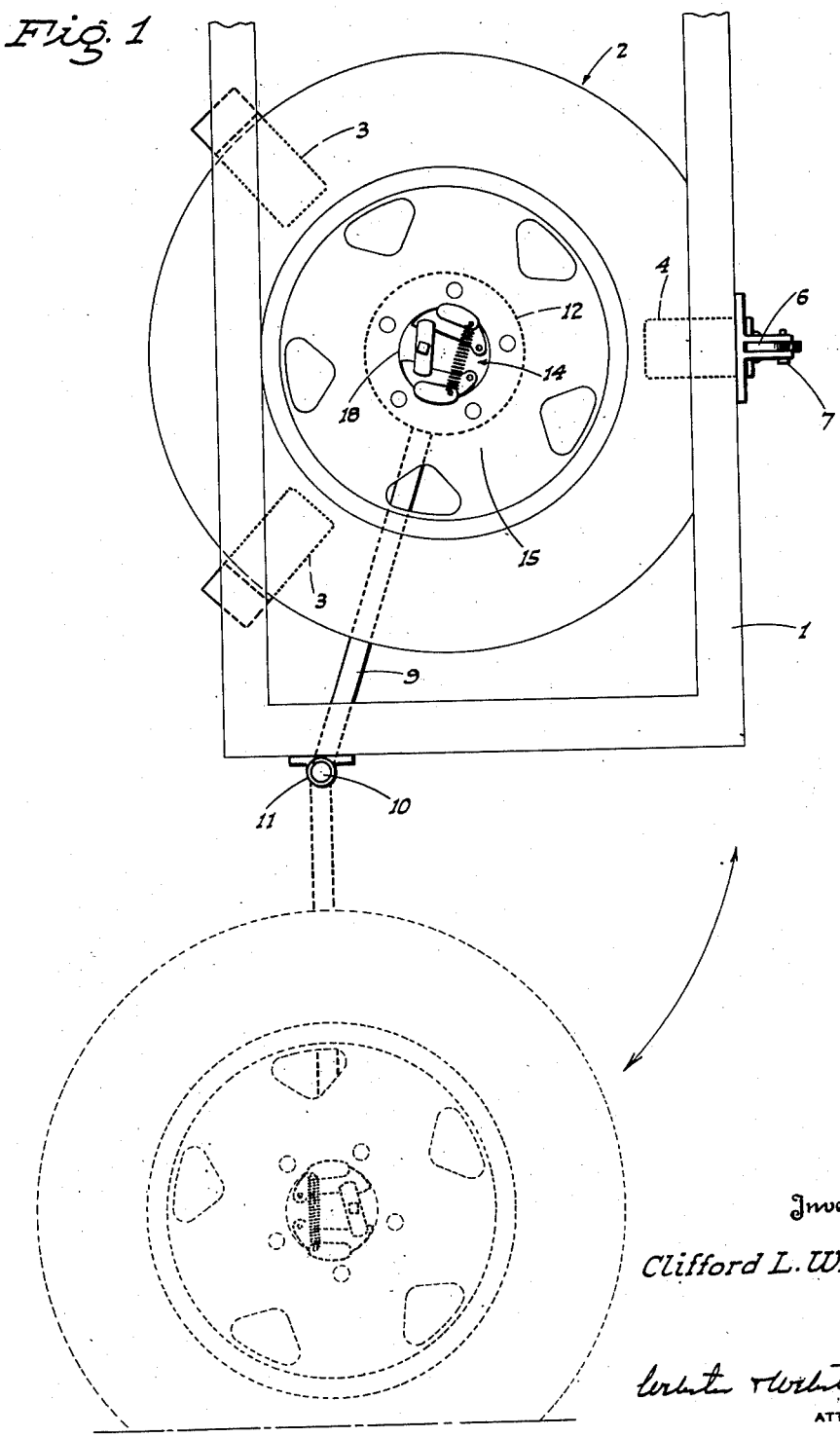
Fig. 1 is a top plan view of the tire rack as in use; the tire and wheel unit being shown in carrying or transport position in full lines, and in its outswung, accessible position in dotted lines.
Figure 2:
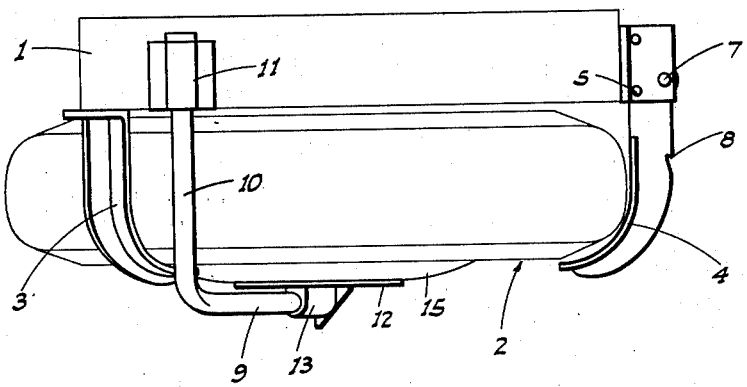
Fig. 2 is an elevation of the tire rack in carrying position.
Figure 7:
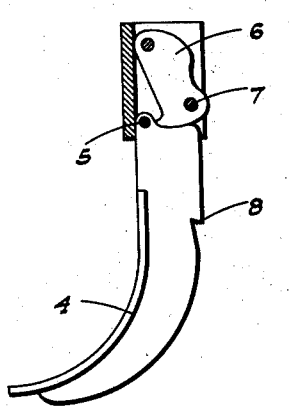
Fig. 7 is a fragmentary transverse sectional elevation showing the swingable, tire and wheel unit suspension hook in its operative position.
Figure 8:
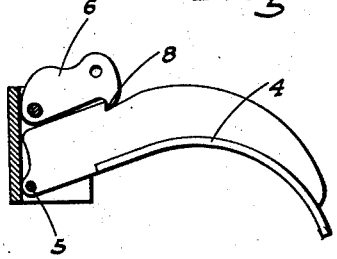
Fig. 8 is a similar view but shows such suspension hook as swung upwardly for release of the tire and wheel unit.

The tire and wheel unit 2 is normally maintained in such horizontal position beneath the main frame 1, as in full lines in Fig. 1, by a plurality of circumferentially spaced suspension hooks; two of such hooks, as at 3, being fixed in connection with the frame, while the third suspension hook 4 is swingably mounted or pivoted, as at 5, for outward and upward swinging motion from a normally dependent operative position, as in Fig. 7, to an upward, out-of-the-way position, as in Fig. 8.

The swingable suspension hook 4 is normally maintained in its lowered working position by means of a pivotally mounted holding dog 6 which works against the upper end of said hook 4 in offset relation to the pivot 5; such dog being releasably held in such position by a removable cross pin 7.

When the swingable hook 4 is in its upward, out-of-the-way position, it is releasably held in such position by a catch 8 comprised of cooperating elements on said dog 6 and hook 4.

The tire rack includes the following structure for supporting the tire and wheel unit 2 for swinging motion from the transport position beneath the frame 1, and an access position beyond such frame:

The numeral 9 indicates a horizontal swing arm formed at one end with an upturned post 10 journaled, as at 11, on the frame 1 outwardly of the transport position of the tire and wheel unit 2.

The swing arm 9 extends below said tire and wheel unit 2, and at its free end such swing arm is fitted with a circular mounting plate 12 pivotally attached, as at 13, to said arm for motion between a horizontal position and a vertical position with said plate alongside the arm. The mounting plate 12 is normally horizontal, and is fitted, on its then uppermost face, with a clamping device or expansible chuck, indicated generally at 14, and which device or chuck is adapted to engage in holding relation with the center plate or wheel 15 of the tire and wheel unit 2.

The expansible chuck 14 comprises a pair of peripherally arcuate chuck jaws 16 pivoted, as at 17, to the mounting plate 12.

The expansible chuck 14 when released engages upwardly through the central opening 18 in the wheel 15, and the chuck jaws 16 are then expanded by a double-ended cam 19 pivoted on the mounting plate 12, as at 20, and turned between said chuck jaws 16 by a wrench applied to the head 21 of the pivot 20. As the double-ended cam 19 is turned to a position to expand the chuck jaws 16, a double-ended hold-down finger 22 turns with the head 21 and rides over said chuck jaws 16, and additionally said jaws have flange plates 23 which overlie adjacent portions of the wheel 15 so as to prevent the latter from escaping upwardly from the mounting plate 12 when the tire and wheel unit 2 is supported in transport position.

A tension spring 24 connected between the chuck jaws 16 urges them in a direction tending to release the same, the flange plates 23 being clear of the wheel 15 when the expansible chuck 14 is released; i. e. said chuck then being of no greater maximum diameter than the central opening 18.

Figure 3:
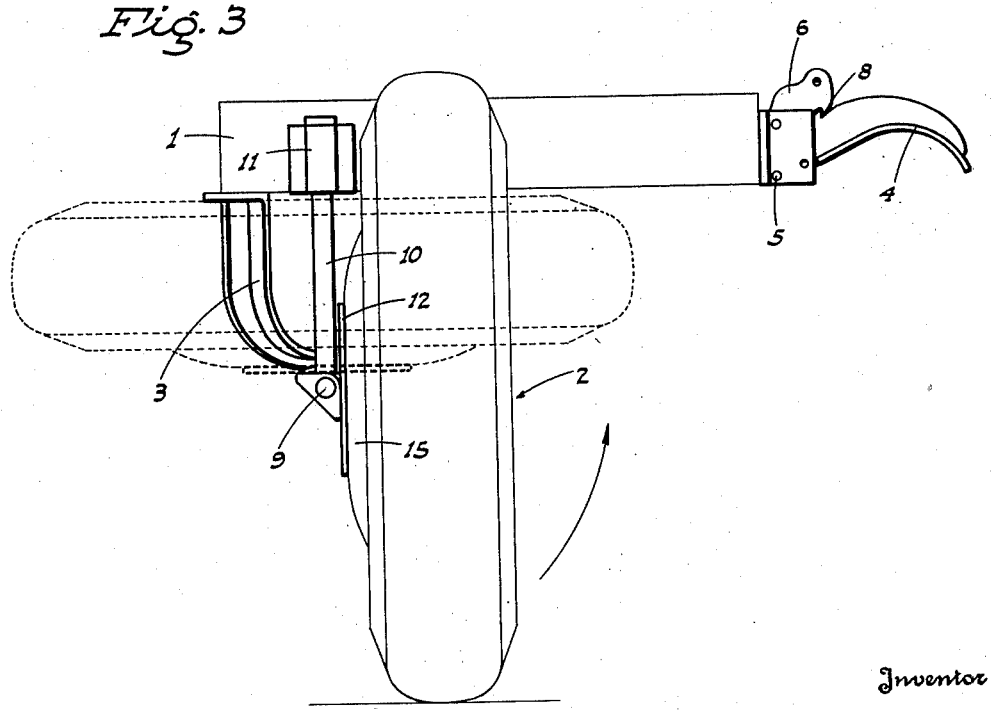
Fig. 3 is a similar view, but shows the rack in position with the tire and wheel unit accessible beyond the frame.
Figure 4:
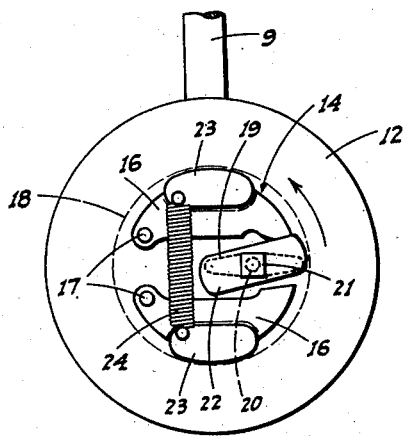
Fig. 4 is a fragmentary plan view showing the expansible chuck, for a tire and wheel unit, in released position.
Figure 5:
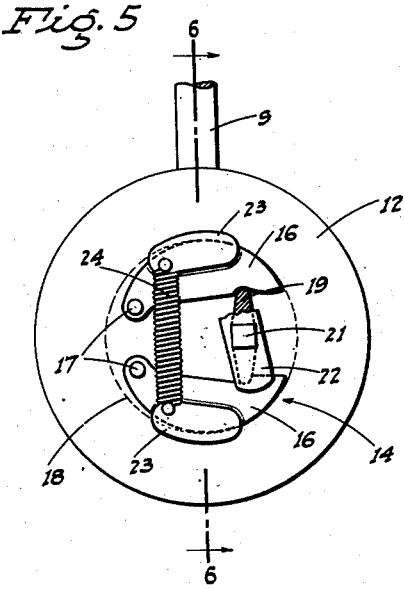
Fig. 5 is a similar view, but shows the chuck expanded with part of element 22 broken away.
Figure 6:
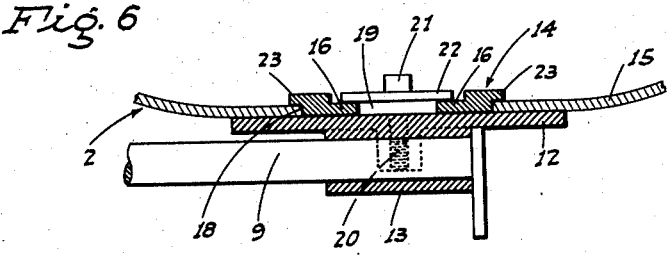
Fig. 6 is a cross section on line 6—6 of Fig. 5.

When it is desired to remove the tire and wheel unit 2 from beneath the frame 1, the swingable suspension hook 4 is released, swung upward, and latched in its out-of-the-way position, as in Fig. 8. Thereafter, the swing arm 9 is swung in a direction to move the tire and wheel unit 2 out of the fixed suspension hooks 3 and to an access position beyond the frame 1, as in dotted lines in Fig. 1. Thereafter said tire and wheel unit 2 is quarter-turn rotated from its horizontal position, as in dotted lines in Fig. 3, to its full line position as in such figure, such quarter-turning being possible by reason of the turnable attachment 13 of mounting plate 12 on the swing arm 9.

After the tire and wheel unit 2 is in vertical position the expansible chuck 14 is released, and said tire and wheel unit is then readily removable from the rack. To place a tire and wheel unit 2 on the rack and to return it to transport position under the frame 1, requires only a reversal of the above described manipulations.

The tire rack provides a very practical, durable, and reliable device for carrying a tire and wheel unit 2 in an out-of-the-way position beneath the frame, yet with such tire and wheel unit always readily available, and movable to an access position without undue manual exertion.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a motor-vehicle tire rack which includes a tire and wheel unit mounting plate, an expansible chuck mounted on the plate to engage in the central opening of the wheel to secure said unit to the mounting plate; said chuck including opposed chuck jaws pivoted on the plate, a double-ended cam pivoted on the plate between the jaws and operative to expand the same in the central opening of the wheel, wheel hold-down flanges on the jaws formed and positioned to seat on the wheel opposite the plate when the jaws are expanded, and means operative to actuate said cam.

2. A tire rack, as in claim 1, in which said last named means comprises a pivot for the cam, and a head on the pivot to receive a wrench; the pivot for the cam being fitted with a double ended hold-down finger which rides over the jaws when the cam is in jaw expanding position.

3. In a motor vehicle having a frame, a tire rack under the frame including a plurality of depending tire-suspension hooks, means pivotally mounting one of said hooks on the frame for swinging in a vertical plane and limiting the downward swinging movement of said hook; a dog and catch pivoted in connection with the frame above the hook and adapted to seat on the upper face of the same in locking relation when the hook is depending, the dog including an inwardly facing hook on its lower edge and the outer edge of the suspension hook having a notch therein to be engaged by the dog hook in supporting relation when said suspension hook is swung upwardly a predetermined distance.

CLIFFORD L. WHITE.

References Cited in the file of this patent

UNITED STATES PATENTS

| Number | Name | Date |
|---|---|---|
| 1,419,965 | Gerrie | June 20, 1922 |
| 1,876,912 | Gilmore | Sept. 13, 1932 |
| 1,883,032 | Smith | Oct. 18, 1932 |
| 2,449,544 | Ballard | Sept. 21, 1948 |
| 2,479,155 | Clark | Aug. 16, 1949 |
| 2,485,740 | Kazen | Oct. 25, 1949 |
| 2,494,411 | Simi | Jan. 10, 1950 |

FOREIGN PATENTS

| Number | Country | Date |
|---|---|---|
| 749,561 | France | May 8, 1933 |
| 309,081 | Italy | June 24, 1933 |
| 319,113 | Italy | June 30, 1934 |